United States Patent
Kaura

(10) Patent No.: US 9,609,622 B2
(45) Date of Patent: Mar. 28, 2017

(54) PROVISION OF A CUSTOMISED ALERTING NOTIFICATION

(71) Applicant: Samsung Electronics Co., Ltd., Gyeonggi-do (KR)

(72) Inventor: Ricky Kaura, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/387,534

(22) PCT Filed: Mar. 20, 2013

(86) PCT No.: PCT/KR2013/002269
§ 371 (c)(1),
(2) Date: Sep. 23, 2014

(87) PCT Pub. No.: WO2013/141591
PCT Pub. Date: Sep. 26, 2013

(65) Prior Publication Data
US 2015/0079992 A1    Mar. 19, 2015

(30) Foreign Application Priority Data
Mar. 23, 2012  (GB) .................................. 1205183.5

(51) Int. Cl.
*H04W 68/00*  (2009.01)
*H04W 8/18*   (2009.01)
(Continued)

(52) U.S. Cl.
CPC ............ *H04W 68/005* (2013.01); *H04W 8/18* (2013.01); *H04W 36/0022* (2013.01); *H04W 36/14* (2013.01); *H04W 68/12* (2013.01)

(58) Field of Classification Search
None
See application file for complete search history.

(56) References Cited

U.S. PATENT DOCUMENTS

2008/0049725 A1   2/2008   Rasanen
2010/0135246 A1   6/2010   Hallental
(Continued)

FOREIGN PATENT DOCUMENTS

EP   2375812 A2   10/2011
GB   2469875 A    11/2010
(Continued)

OTHER PUBLICATIONS

3GPP (3GPP TR 23.886 V10.0.0, 3rd Generation Partnership Project; Technical Specification Group Services and System Aspects; Feasibility Study of Single Radio Video Call Continuity (vSRVCC); Stage 2 (Release 10), Sep. 2010, pp. 1-33).*

(Continued)

*Primary Examiner* — Leon-Viet Nguyen

(57) ABSTRACT

A customized alerting notification is provided to a user equipment (2) in a wireless communications network comprising a first radio access network (26) and a second radio access network (24). A first message (6, 18, 20) is received from the user equipment at a core network server (4, 16), of the first radio access network on attachment of the user equipment to the first radio access network, the message comprising an indication of a customized alerting notification capability of the user equipment in the second radio access network. In response to initiation of handover of the user equipment from the first radio access network to the second radio access network during an alerting phase of a call initiated from the user equipment using the first radio access network, a second message (12, 22) comprising the indication is sent from the core network server of the first radio access network to a mobility controller (10) coupled with the second radio access network. FIG. 3 to accompany the abstract.

20 Claims, 6 Drawing Sheets

(51) Int. Cl.
*H04W 68/12* (2009.01)
*H04W 36/00* (2009.01)
*H04W 36/14* (2009.01)

(56) References Cited

U.S. PATENT DOCUMENTS

| | | |
|---|---|---|
| 2010/0302937 A1 | 12/2010 | Hu et al. |
| 2012/0014356 A1 | 1/2012 | Mutikainen et al. |
| 2012/0044825 A1 | 2/2012 | Zisimopoulos et al. |
| 2012/0063420 A1 | 3/2012 | Long et al. |
| 2012/0087339 A1 | 4/2012 | Wu |
| 2012/0184254 A1* | 7/2012 | Li ............ H04M 3/02 455/414.1 |
| 2012/0327859 A1* | 12/2012 | Long ............ H04L 65/1016 370/328 |
| 2013/0063540 A1 | 3/2013 | Zisimopoulos et al. |
| 2013/0294407 A1 | 11/2013 | Mutikainen et al. |

FOREIGN PATENT DOCUMENTS

| | | |
|---|---|---|
| WO | WO 2010/109269 A1 | 9/2010 |
| WO | WO 2011/139083 A2 | 11/2011 |
| WO | WO 2012/062488 A1 | 5/2012 |

OTHER PUBLICATIONS

International Search Report dated Jul. 26, 2013 in onnection with International Patent Application No. PCT/KR2013/002269, 3 pages.
Written Opinion of International Searching Authority dated Jul. 26, 2013 in connection with International Patent Application No. PCT/KR2013/002269, 7 pages.
Combined Search and Examination Report Under Sections 17 & 18(3) dated Jul. 23, 2012 in connection with United Kingdom Patent Application No. GB1205183.5; 3 pages.
"Single Radio Call Continuity (SRVCC)"; 3GPP TS 123 216; Version 9.5.0, Release 9; Oct. 2010; 43 pages.

* cited by examiner

PROVISION OF A CUSTOMISED ALERTING NOTIFICATION

CROSS-REFERENCE TO RELATED APPLICATION S

The present application claims priority under 35 U.S.C. §365 to International Patent Application No, PCT/KR2013/002269 filed Mar. 20, 2013, entitled "PROVISION OF A CUSTOMISED ALERTING NOTIFICATION". International Patent Application No, PCT/KR2013/002269 claims priority under 35 U.S.C. §365 and/or 35 U.S.C. §119(a) to United Kingdom Patent Application No. 1205183.5 filed Mar. 23, 2012 and which are incorporated herein by reference into the present disclosure as if fully set forth herein.

TECHNICAL FIELD

The present invention relates generally to wireless communications networks, and more specifically, but not exclusively, to a method and apparatus for providing a customised alerting notification to a user equipment on handover of the user equipment between a first radio access network and a second radio access network in an alerting phase of a call.

BACKGROUND ART

Wireless communications networks, in which a user equipment (UE) such as a mobile handset communicates via wireless links to a network of base stations or other wireless access points connected to a telecommunications network, have undergone rapid development through a number of generations of radio access technology. The initial deployment of systems using analogue modulation has been superseded by second generation (2G) digital systems such as GSM (Global System for Mobile communications), typically using GERA (GSM Enhanced Data rates for GSM Evolution Radio Access) radio access technology, and these systems have themselves been replaced by or augmented by third generation (3G) digital systems such as UMTS (Universal Mobile Telecommunications System), using the UTRA (Universal Terrestrial Radio Access) radio access technology. Third generation standards provide for a greater throughput of data than is provided by second generation systems; this trend is continued with the proposals by the Third Generation Partnership Project (3GPP) of the Long Term Evolution (LTE) system, using E-UTRA (Evolved UTRA) radio access technology, which offers potentially greater capacity and additional features compared with the previous standards.

Note that the term "GERA" is used herein to refer to the radio access technology associated with GERAN (GERA networks), "UTRA" is used to refer to the radio access technology associated with UTRAN (UTRA networks), and similarly the term "E-UTRA" or "LTE" is used to refer to the radio access technology associated with E-UTRAN (E-UTRA networks).

LTE is designed primarily as a high speed packet switched network, and voice services, packet switched voice services and in particular Voice over Internet Protocol Multimedia Subsystem (VoIMS) services are envisaged, whereas previous generation systems such as UMTS support voice services that are primarily circuit switched.

As new technology is introduced, networks are typically deployed which include radio access networks that use a radio access technology according to a recent standard and also legacy radio access networks that use a legacy radio access technology. A user equipment may be typically capable of communication using two or more radio access technologies, so for example the user equipment is able operate using one radio access technology, perhaps offering high capacity, where this is available, but being able to operate using a legacy radio access technology, in those service areas of the network that do not support the other radio access technology, or that do not support preferred features.

In service areas where a radio access network, such as an LTE/E-UTRA Packet Switched (PS) network, does not support voice communication, user equipment may follow a defined procedure to fall back to using another radio access network, such as UTRAN or GERAN, for voice communications, typically falling back to Circuit Switched (CS) voice communications, according to a Voice Call Continuity (VCC) handover procedure.

The Internet Protocol Multimedia Subsystem (IMS) is typically used to control packet switched services offered over the E-UTRA network; control of circuit switched services in a UTRA/GERA network typically involves a mobility controller, such as a Mobility Switching Centre (MSC). The mobility controller typically communicates with the session transfer controller provided by the IMS, during session transfer according to a VCC handover procedure.

A user equipment may be equipped with a single radio transceiver, for reasons of economy or for minimising power consumption, so that simultaneous communication with two radio access networks is not possible. In this case the handover protocol typically uses a break-before-make radio connection during handover. Handover procedures known as Single Radio Voice Call Continuity (SRVCC) procedures have been developed for such situations, and in particular video SRVCC (vSRVCC) procedures for handing over conversational video calls (i.e. calls with voice and video content).

A user making a call may be provided with a customised alerting notification during the alerting phase of a call, which may be referred to as a Customised Alerting Tones (CAT), so that, for example, a calling user may hear an audio clip instead of the standard ring back tone. CAT may also be referred to as Colour Ring Back Tone (CRBT). Multimedia CAT (mCAT) refers to the ability to not only replace the ring back tone by audio, but with other types of media, e.g. video. CAT or mCAT may be provided by the CS (Circuit Switched) network or by the IMS (Internet Protocol Multimedia Subsystem) network.

Typically, the user equipment's capabilities in the circuit switched domain regarding CAT, and in particular mCAT are indicated to a mobility controller of a circuit switched network on initiating a call in the circuit switched network, so that the mobility controller may enable the delivery of the mCAT to the user equipment. However, if a SRVCC procedure, and in particular a vSRVCC procedure takes place for the calling user equipment during the alerting phase of a call, the user equipment may initiate the call in the packet switched domain, so that the indication of the mCAT capability of the user equipment is not sent to the mobility controller. As a result, when the user equipment is handed over to the circuit switched domain, the mobility controller may not know the mCAT capabilities of the user equipment, and so mCAT may not be provided, so that the caller may experience a lack of alerting tone.

DISCLOSURE OF INVENTION

Technical Problem

The present invention has been made to address at least the above problems and/or disadvantages and to provide at least the advantages described below. Accordingly, Embodiments of the invention ameliorate the problems of prior art systems.

Solution to Problem

In accordance with a first aspect of the present invention, there is provided a method of providing a customised alerting notification to a user equipment in a wireless communications network comprising a first radio access network and a second radio access network, the second radio access network being coupled with a mobility controller, the mobility controller having an association with a core network server of the first radio access network, the user equipment being capable of communication with the core network server of the first radio access network by use of the first radio access network, the method comprising:

receiving a first message from the user equipment at the core network server of the first radio access network on attachment of the user equipment to the first radio access network, the message comprising an indication of a customised alerting notification capability of the user equipment in the second radio access network;

in response to initiation of handover of the user equipment from the first radio access network to the second radio access network during an alerting phase of a call initiated from the user equipment using the first radio access network, sending a second message from the core network server of the first radio access network to the mobility controller comprising the indication of the customised alerting notification capability of the user equipment in the second radio access network.

This has an advantage that the mobility controller may receive an indication of the customised alerting notification capability of the user equipment in the second radio access network, even in cases where a call was initiated from the user equipment in the first radio access network, so that the mobility controller may enable delivery of the customised alerting notification to the user equipment when the user equipment is handed over to the second network during the alerting phase of the call.

It is not conventional for a message from the user equipment to the core network server of the first radio access network, sent on attachment of the user equipment to the first radio access network, to indicate capability of the user equipment in the second radio access network, since it is conventional to indicate a capability in the radio access network to which the user equipment is being attached.

In an embodiment of the invention, the method comprises, at the mobility controller, supporting delivery of the customised alerting notification to the user equipment after receipt of the second message.

In an embodiment of the invention, the first radio access network is capable of supporting packet switched voice communication and the second radio access network is capable of supporting circuit switched voice communication.

In an embodiment of the invention, the user equipment has a single radio interface for communicating with the first radio access network and the second radio access network, such that only one radio connection with a radio access network can exist at any given point in time.

In an embodiment of the invention, the handover comprises video Single Radio Voice Call Continuity (vSRVCC) procedures.

In an embodiment of the invention, including the first indication in the first message is in dependence on the user equipment supporting video Single Radio Voice Call Continuity (vSRVCC) procedures.

This has an advantage of increasing the efficiency of signalling by signalling only in a case where including the indication in the first message may be required.

In an embodiment of the invention, the customised alerting notification comprises video content.

In an embodiment of the invention, the customised alerting notification is a multimedia Customised Alerting Tone (mCAT).

In an embodiment of the invention, the customised alerting notification capability is a capability in a Circuit Switched (CS) domain.

In an embodiment of the invention, the core network server of the first radio access network is a Mobility Management Entity (MME).

In an embodiment of the invention, the first message is a LTE attach message.

In an embodiment of the invention, the first message is a Tracking Area Update message.

In an embodiment of the invention, the second message is a handover request sent by the MME to the mobility controller.

In an embodiment of the invention, the handover request is a Packet Switched to Circuit Switched (PS to CS) Request.

In an alternative embodiment of the invention, the core network server of the first radio access network is an IMS Application Server, which may be a Service Centralisation and Continuity Application Server (SCC AS).

In an embodiment of the invention, the first message is a SIP INVITE message.

In an embodiment of the invention, the first message is relayed to the Service Centralisation and Continuity Application Server (SCC AS) by a SIP Proxy.

In an embodiment of the invention, the second message is a SIP INFO message.

In an embodiment of the invention, the mobility controller is a Mobile Switching Centre (MSC).

In accordance with a second aspect of the present invention, there is provided a user equipment for use in a wireless communications network comprising a first radio access network and a second radio access network, the second radio access network being coupled with a mobility controller, the mobility controller having an association with a core network server of the first radio access network, the user equipment being capable of communication with the core network server of the first radio access network by use of the first radio access network, the user equipment being arranged to:

send a first message from the user equipment to the core network server of the first radio access network on attachment of the user equipment to the first radio access network, the message comprising an indication of a customised alerting notification capability of the user equipment in the second radio access network;

initiate a call using the first radio access network; and on handover of the user equipment from the first radio access network to the second radio access network during an alerting phase of the call, if a customised alerting notification is available, receive a customised alerting notification delivered with support of the mobility controller after receipt of a second message at the mobility controller from the core network server of the first network comprising the indication of the customised alerting notification capability of the user equipment in the second radio access network.

In accordance with a third aspect of the present invention, there is provided a core network server of a first radio access network, the core network server being arranged to enable the delivery of an alerting notification at a user equipment in a wireless communications network comprising a first radio access network and a second radio access network, the second radio access network being coupled to a mobility controller, the mobility controller having an association with the core network server of the first radio access network, the user equipment being capable of communication with the core network server by use of the first radio access network, the server being arranged to:

receive a first message from the user equipment on attachment of the user equipment to the first radio access network, the message comprising an indication of a customised alerting notification capability of the user equipment in the second radio access network; and on handover of the user equipment from the first radio access network to the second radio access network during an alerting phase of a call initiated from the user equipment using the first radio access network, sending a second message to the mobility controller comprising the indication of the customised alerting notification capability of the user equipment in the second radio access network.

In accordance with a fourth aspect of the present invention, there is provided a mobility controller arranged to enable delivery of a customised alerting notification to a user equipment in a wireless communications network comprising a first radio access network and a second radio access network, the second radio access network being coupled to the mobility controller, the mobility controller having an association with a core network server in the first radio access network, the user equipment being capable of communication with the core network server of the first radio access network by use of the first radio access networks, the mobility controller being arranged to:

receive a message from the core network server of the first radio access network comprising an indication of the customised alerting notification capability of the user equipment in the second radio access network, the message being sent in response to initiation of handover of the user equipment from the first radio access network to the second radio access network during an alerting phase of a call initiated from the user equipment using the first radio access network; and support delivery of the customised alerting notification to the user equipment after receipt of the message.

Further features and advantages of the invention will be apparent form the following description of preferred embodiments of the invention, which are given by way of example only.

Advantageous Effects of Invention

Advantages, and salient features of the invention will become apparent to those skilled in the art from the following detailed description, which, taken in conjunction with the annexed drawings, discloses exemplary embodiments of the invention.

MODE FOR THE INVENTION

By way of example an embodiment of the invention will now be described in the context of a telecommunication network including a radio access network supporting communication using E-UTRA/LTE radio access technology, as associated with E-UTRAN networks in LTE systems, supporting packet switched voice communication, and another radio access network supporting communication using UTRA radio access technology, as associated with UTRAN networks in UMTS systems, supporting circuit switched voice communication. However, it will be understood that this is by way of example only and that other embodiments may involve wireless networks using other radio access technologies, such as IEEE802.16 WiMax systems; embodiments are not limited to the use of a particular radio access technology.

Initial deployments of E-UTRAN networks are typically within areas of coverage of existing wireless networks, such as legacy UTRAN networks. On initial deployment, a E-UTRAN network may provide provides service to a smaller geographical area than that covered by existing legacy networks, covering for example city centres, and the areas covered may not be contiguous. Furthermore, only a subset of the available network features may be enabled, and the enablement of features may not be uniform across the network. In particular, due to its potentially enhanced data capacity in comparison with legacy systems, initial deployments of E-UTRAN may concentrate on providing high bandwidth data services, for example to LTE enabled equipment such as personal digital assistants (PDAs) or to user equipment in the form of plug in communication modules for laptop computers. For this reason, the primary LTE voice service, a packet switched service known a Voice over IMS (VoIMS), may not be available in certain areas.

If a user equipment moves out of an area of coverage of an E-UTRAN network, then a handover to a UTRAN network may be required, and the handover may be a Single Radio Voice Call Continuity (SRVCC) handover, and in particular video SRVCC (vSRVCC) procedures for handing over calls having a voice and video content.

Figure 1:
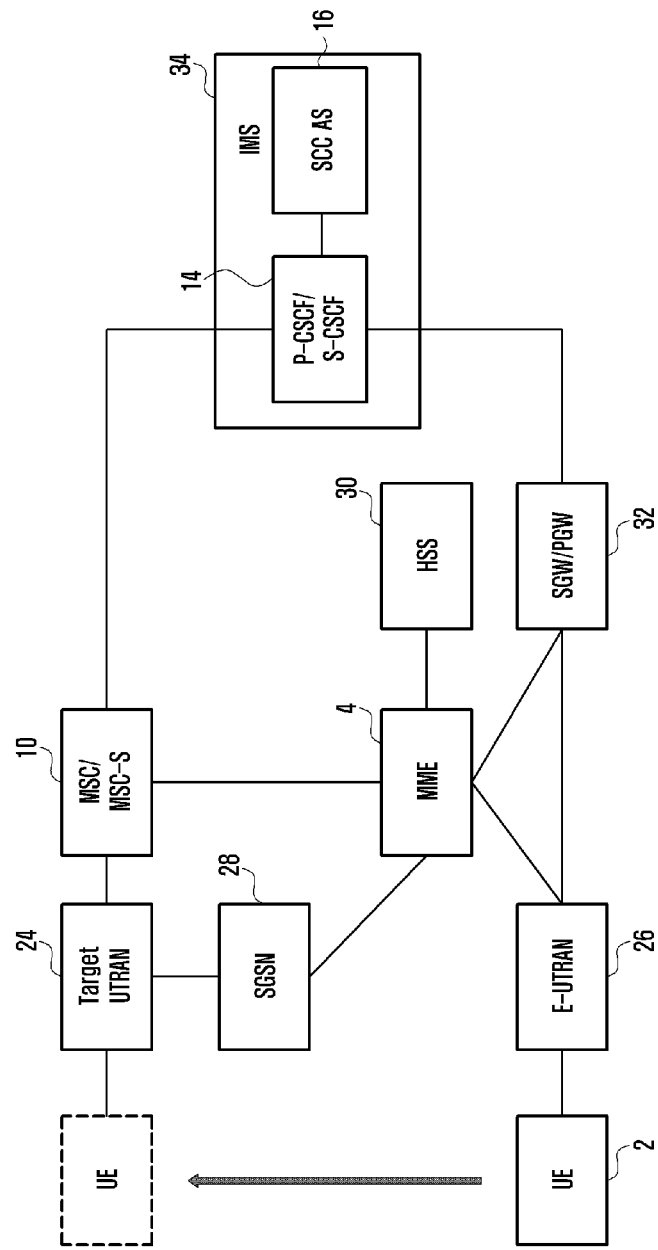
FIG. 1 is a schematic diagram showing a wireless communications network comprising a first radio access network and a second radio access network.

FIG. 1 shows signalling paths in a wireless communications network in support of vSRVCC handover. A user equipment 2 is connected to a first radio access network, being in this example a E-UTRAN radio access network 26, and handover is required to a second radio access network, in this example a UTRAN radio access network 24, so that the user equipment, on handover to the second radio access network, is connected to the UTRAN radio access network 24.

The first radio access network has a core network including a core network server of the first radio access network, which may be a Mobile Management Entity (MME) 4, which is connected to a Home Subscriber Server (HSS) 30 and a Serving GateWay/Packet GateWay (SGW/PGW) 32, which acts in support of handover within E-UTRAN. An Internet Protocol Multimedia Subsystem (IMS) 34 is capable of communication with the first radio access network via the SGW/PGW 32 and with the second radio access network via a mobility controller 10.

The second radio access network is coupled with the mobility controller, in this example the Mobile Switching Centre (MSC) 10 which may comprise a Mobile Switching Centre Server (MSC-S). The second radio access network also has a Serving General Packet Radio Service Support Node (SGSN) 28, which has a connection to the MME 4.

The IMS 34 comprises a core network server of the first radio access network, which may be a Service Centralisation and Continuity Application Server (SCC AS) 16.

Embodiments of the invention relate to customised notification tones, which may be referred to as Customised Alerting Tones (CAT), and in particular the first and second embodiments of the invention relate to multimedia Customised Alerting Tones (mCAT), which typically include video content. In general, the term Customised Alerting Tones (CAT) refers to the ability for a calling user (party-A) to hear an audio clip instead of the standard ring back tone from the called user's (party-B) network. CAT is sometimes referred to as Colour Ring Back Tone (CRBT). CAT is a typically a terminating network service, i.e. a server in the terminating network is responsible for transport of the media back to party-A. Party-B can decide through user subscription control which media to play to which user. An application server in the originating network may override the terminating network CAT and play originating CAT media to the user. Multimedia CAT (mCAT) refers to the ability to not only replace the ring back tone by audio, but with other types of media, e.g. video. CAT or mCAT may be provided by the CS (Circuit Switched) network or by the IMS (Internet Protocol Multimedia Subsystem) network, and may also be also interworked between CS and IMS. In IMS three different models are typically supported (referred to as Forking, Early-Session and Gateway models).

In existing systems, a mobile station supporting multimedia CAT during the alerting phase of a mobile originated multimedia call establishment typically indicates support of this capability to the network in the Call Control Capabilities information element in the SETUP message.

However, a problem may arise since the MSC cannot receive the multimedia CAT capabilities of the UE during SRVCC, as an indication of the capabilities may only be sent in the CS SETUP. When SRVCC occurs and the call that is being handed over is in the Alerting Phase, the network does not receive a CS SETUP request from the UE. The MSC needs to be aware that the UE can support multimedia CAT so it has the ability to provide multimedia CAT to the UE prior to connecting the call. A user may be placing a voice call on the PS network and receiving video CAT and while the call is alerting (early media playing), the network performs vSRVCC. Upon handover, the user may experience a "ghost call", in which the CAT media stops until the remote user answers the call. Since ringing/alerting may be up to 40 seconds or more, there is a potential for the originating user to hang up, hearing nothing, which may cause a loss of potential revenue for the operator and provide an unsatisfactory experience to the user.

In a first embodiment of the invention, a customised alerting notification is provided to a user equipment 2 in a wireless communications network comprising a first radio access network 26, typically capable of supporting packet switched voice communication, and a second radio access network 24, typically capable of supporting circuit switched voice communication. The user equipment 2 may have a single radio interface for communicating with the first radio access network and the second radio access network, such that only one radio connection with a radio access network can exist at any given point in time. The second radio access network may be coupled with a mobility controller, which may be a Mobile Switching Centre (MSC) 10. The mobility controller may have an association with a core network server of the first radio access network 4, 16, which may be, in a first embodiment of the invention, a mobility management entity (MME) 4. The user equipment is capable of communication with the core network server of the first radio access network by use of the first radio access network.

Figure 2:
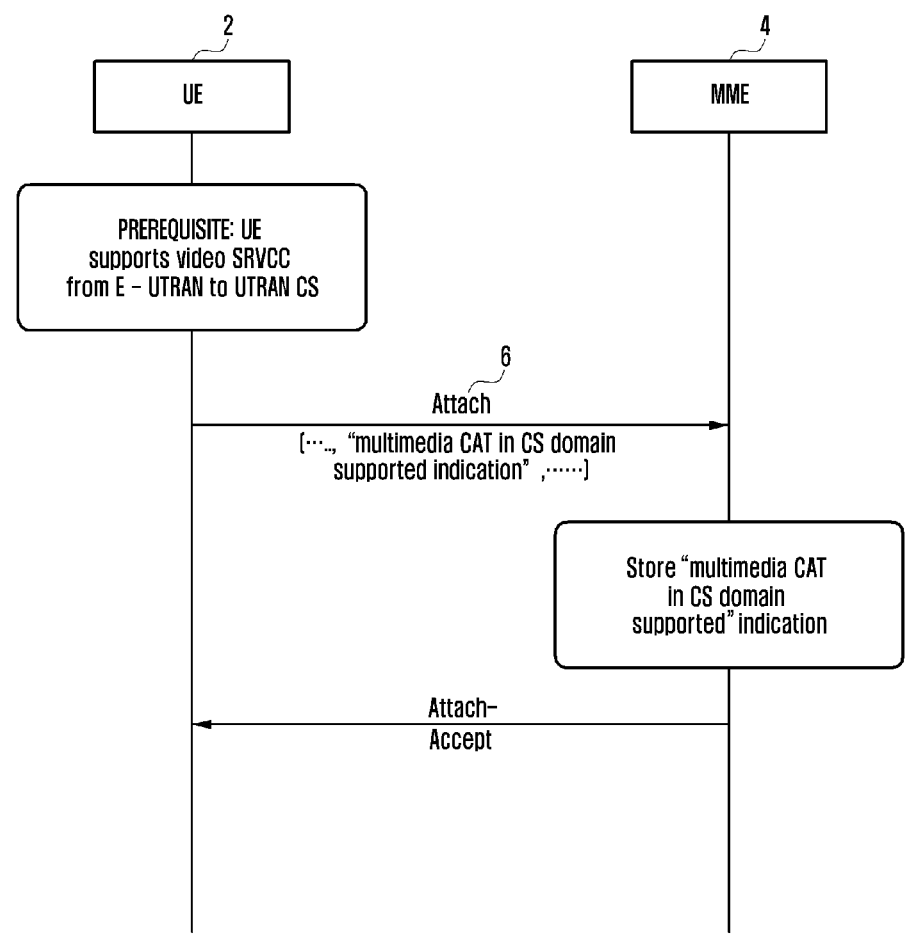
FIG. 2 is a diagram showing message flow between a user equipment and a server (MME) in a first embodiment of the invention.

As shown in FIG. 2, in an embodiment of the invention, a first message 6 is received from the user equipment 2 at the core network server of the first radio access network (the MME in this embodiment) 4 on attachment of the user equipment to the first radio access network, the message comprising an indication of a customised alerting notification capability of the user equipment in the second radio access network. The customised alerting notification may comprise video content, and may be a multi-media Customised Alerting Tone (mCAT), and the indication may relate to the capability in a circuit switched (CS) domain.

Figure 3:
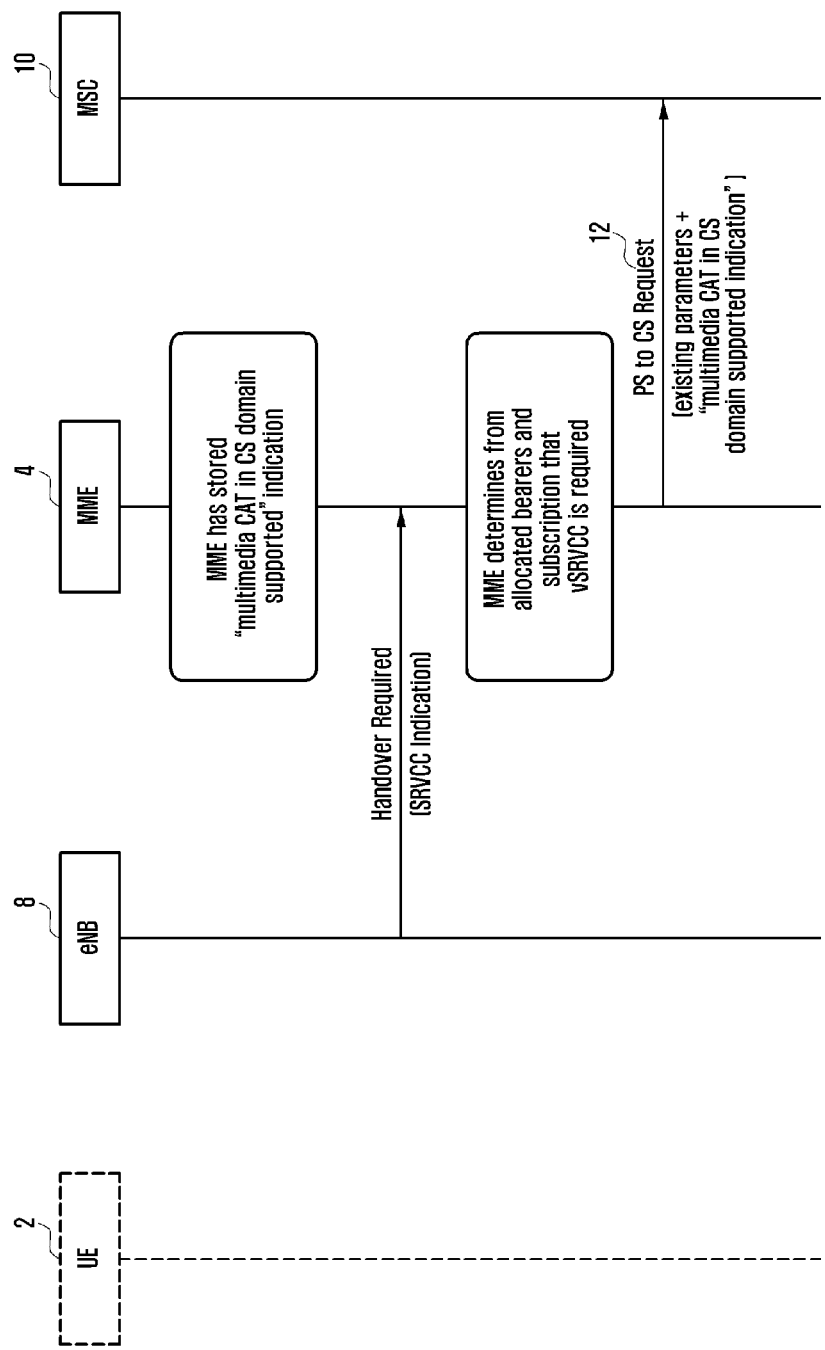
FIG. 3 is a diagram showing message flow between an eNB, a server (MME) and a mobility controller (MSC) in the first embodiment of the invention.

As shown in FIG. 3, in an embodiment of the invention, as a result of the initiation of handover of the user equipment from the first radio access network to the second radio access network during an alerting phase of a call initiated from the user equipment using the first radio access network, a second message 12 is sent from the core network server of the first radio access network (in this embodiment the MME) 4 to the mobility controller (in this case the MSC) 10 comprising the indication of the customised alerting notification capability of the user equipment in the second radio access network. The handover may comprise video Single Radio Voice Call Continuity (vSRVCC) procedures, and including the first indication in the first message may be in dependence on the user equipment supporting video Single Radio Voice Call Continuity (vSRVCC) procedures. After receipt of the second message 12 by the mobility controller 10 and on completion of the handover procedure, the mobility controller 10 may support delivery of the customised alerting notification to the user equipment 2.

In the first embodiment of the invention, the first message 6 may be a LTE attach message or a Tracking Area Update message sent to the MME, and the handover request may be a Packet Switched to Circuit Switched Request.

Figure 4:
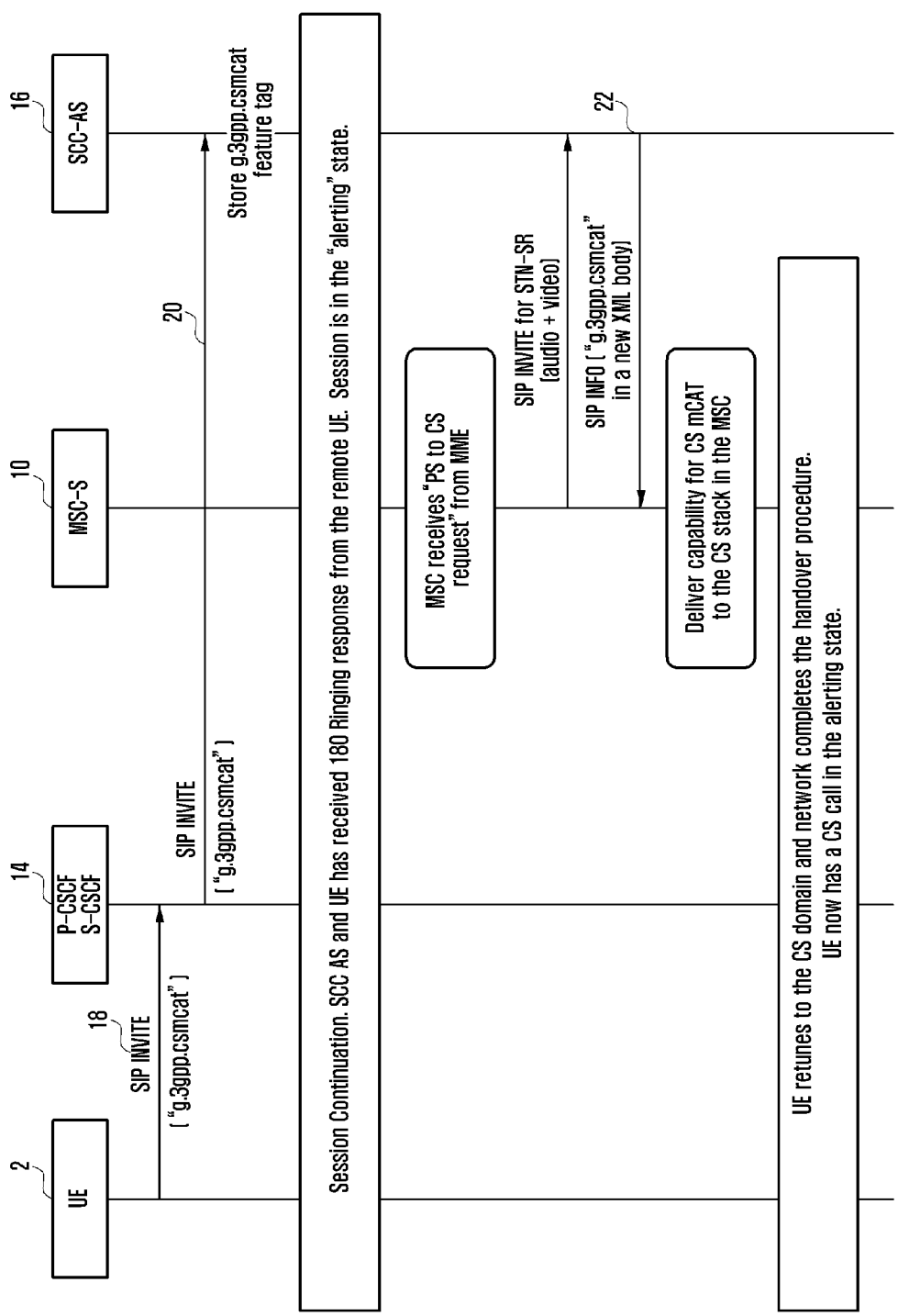
FIG. 4 is a diagram showing message flow in a second embodiment of the invention.

FIG. 4 shows a second embodiment of the invention, in which the core network server of the first radio access network, to which the first message is sent, and from which the second message is sent, is an IMS Application Server, such as the Service Centralisation and Continuity Application Server (SCC AS) 16. In the second embodiment of the invention, the first message may be a SIP invite message 18, 20, and the first message is relayed to the SCC AS by a SIP Proxies 14, such as a P-CSCF (Proxy Call Session Control Function) and S-CSCF (Serving Call Session Control Function). In the second embodiment of the invention, the second message may be a SIP INFO message 22.

Embodiments of the invention have the advantage that the mobility controller may receive an indication of the customised alerting notification capability of the user equipment in the second radio access network, even in cases where a call was initiated from the user equipment in the first radio access network, so that the mobility controller may enable delivery of the customised alerting notification to the user equipment when the user equipment is handed over to the second network during the alerting phase of the call.

Embodiments of the invention will now be described in more detail.

In an embodiment of the invention, the user equipment may indicates the multimedia CAT capability during LTE attach and Tracking Area Update procedures to the MME. The MME stores the CAT capability for usage at the time of handover. Upon Handover, if the MME determines that vSRVCC handover is required, then the multimedia CAT capability is included in the "PS to CS request" message sent to the MSC. The MSC may treat the multimedia CAT capability received from the MME as though it has received the multimedia CAT capability in the "call control capabilities" IE (information element) in the CS SETUP message.

If a UE having vSRVCC capability supports multimedia CAT in the CS domain, the UE may include a multimedia CAT indication in the Attach Request message and in Tracking Area Updates. The MME stores this information to be used during the handover procedure.

In an embodiment of the invention, the UE may include a "multimedia CAT in CS domain" indication as part of the "UE Network Capabilities" sent in E-UTRAN Attach and Tracking Area Update if the UE supports vSRVCC from E-UTRAN to UTRAN CS. At the MME, the "multimedia CAT in CS domain" indication may be stored. The MME may include the "multimedia CAT in CS domain" indication in the "PS to CS Request" sent over the Sv interface if it receives a "Handover Required" message including the "SRVCC indication" and the MME determines that vSRVCC is required. The MSC may store the "multimedia CAT in CS domain" indication in the same memory location in the MSC, as though the MSC had received the support of multimedia CAT in the Call Control Capabilities IE in the SETUP message. In the embodiment of the invention, existing functionality related to delivery of multimedia CAT in the CS domain may be used, and the existing information relating to "multimedia CAT" capability of the UE for the CS domain is transported through a different channel, i.e. via the MME rather than directly to the MSC.

In an alternative embodiment of the invention, the CS multimedia CAT capability may be delivered to the network when the UE starts an IMS session. A new feature tag may be defined: "g.3gpp.csmcat", which the UE may include in each INVITE request if it supports multimedia CAT in the CS domain and supports video SRVCC. The SIP Proxies may forward this information to the appropriate application server (SCC AS). The SCC AS may store this information, and if vSRVCC occurs, the MSC (typically the MSC Server) may send a "SIP INVITE for STN-SR" to the SCC AS. If the session is in the "alerting state", the SCC AS will send a SIP-INFO to the MSC-Server to set the MSC-Server to the correct state. In this SIP-INFO, the SCC AS may include the "g.3gpp.csmcat" feature tag in a new XML body. The IMS stack on the MSC server may provide this information to the CS stack on the MSC server. After completion of SRVCC handover with the CS call still in Alerting State, the MSC may enable the provision of multimedia CAT to the user. The media feature tag "g.3gpp.csmcat" may indicate that the device is capable of supporting multimedia CAT in the CS domain. Boolean values may be appropriate for use with this media feature tag. The feature-tag may be used, for example in a communications application, for describing the capabilities of a device, such as a phone or PDA, for example, indicating that a mobile phone can receive multimedia CAT on transitioning to the CS domain following video SRVCC.

At the UE, a feature tag may be included in the Contact-Header of an INVITE request if UE supports CS multimedia CAT and video SRVCC. At the SCC AS, the "multimedia CAT in CS domain" feature tag may be stored, and on receipt of an INVITE for STN-SR with audio and video media for a session in the alerting state, the CS multimedia CAT indication may be included in an XML body in the SIP INFO sent to the MSC Server. The MSC Server may receive and process the new XML body, and send the CS multimedia CAT indication from the IMS stack to the CS stack.

Figure 5:
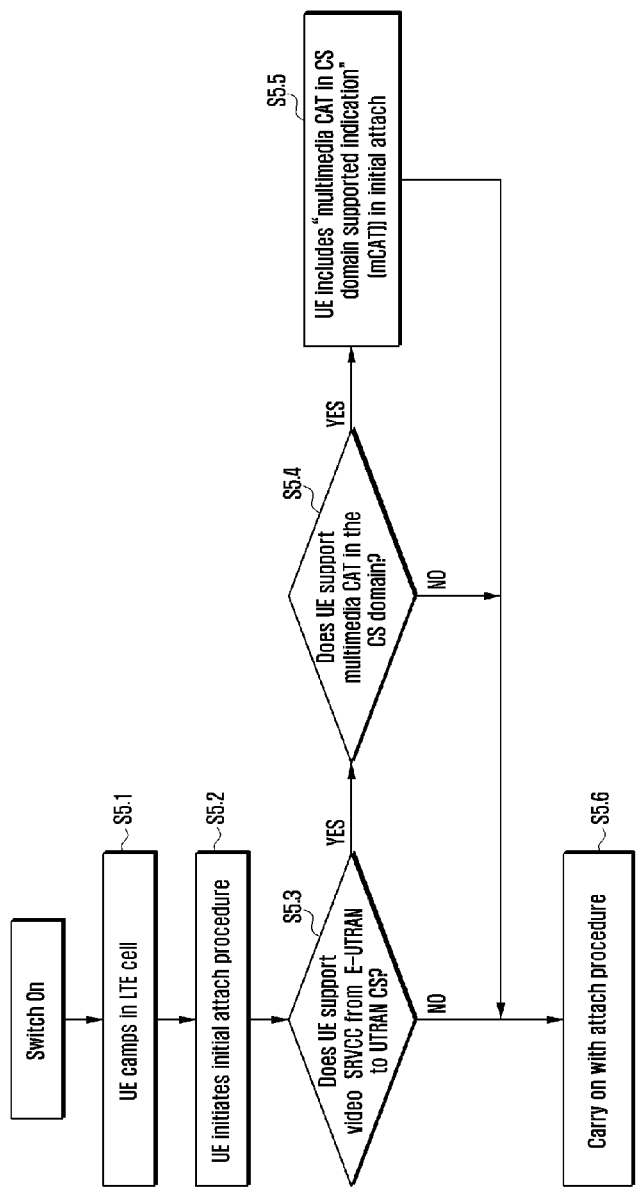
FIG. 5 is a flow diagram illustrating procedures at a user equipment in the first embodiment of the invention.

FIG. 5 illustrates procedures that may be carried out at a user equipment in an embodiment of the invention, as steps S5.1 to S5.6. As may be seen from FIG. 5, the user equipment includes an indication that the user equipment supports multimedia CAT in the CS domain in the first message, in this case the initial attach message, in dependence on the UE supporting vSRVCC and supporting mCAT in the CS domain.

Figure 6:
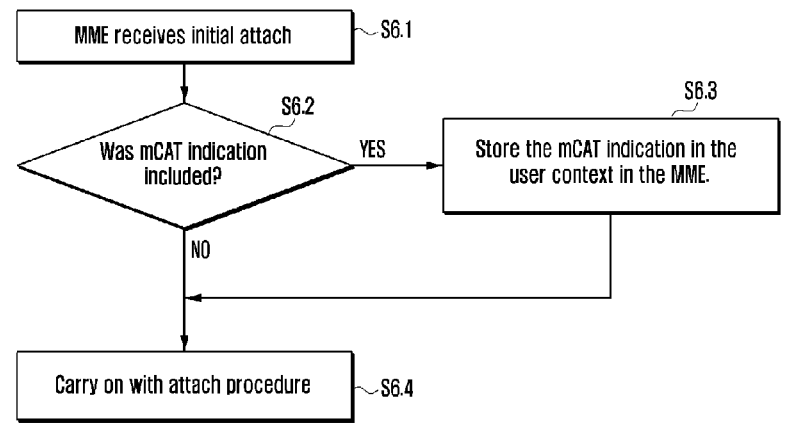
FIG. 6 is a flow diagram illustrating procedures at a server (MME) on LTE attach in the first embodiment of the invention.

FIG. 6 illustrates procedures at the MME on initial attach in an embodiment of the invention, according to steps S6.1 to S6.4. As may be seen from FIG. 6, the MME stores an indication of a customised alerting notification capability of the user equipment in the second radio access network, in this case the mCAT indication, if the indication was included in the initial attach message from the UE.

Figure 7:
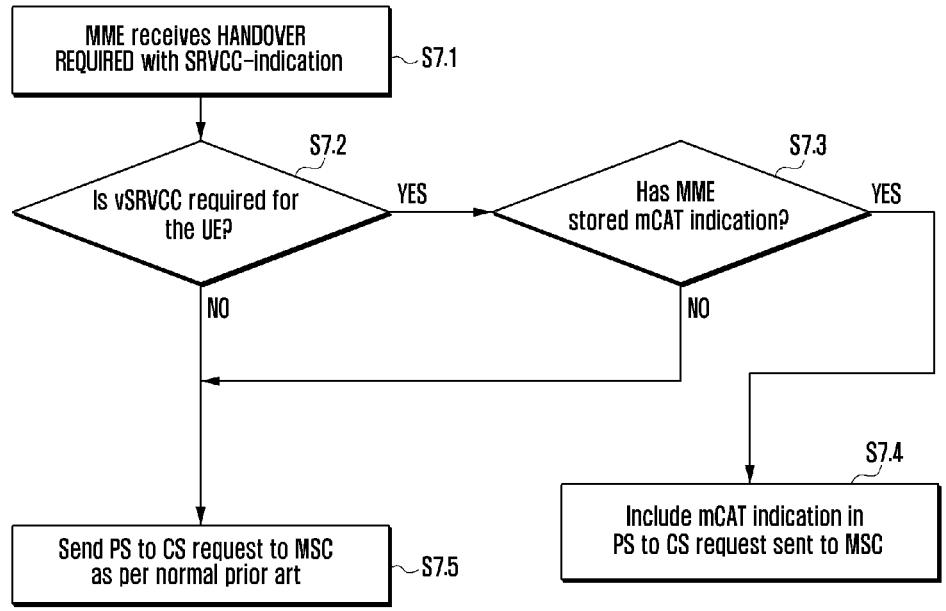
FIG. 7 is a flow diagram illustrating procedures at a server (MME) at handover in the first embodiment of the invention.

FIG. 7 illustrates procedures at the MME at a SRVCC handover in an embodiment of the invention, according to steps S7.1 to S7.5. As may be seen from FIG. 7, the MME includes an indication of a customised alerting notification capability of the user equipment in the second radio access network, in this case the mCAT indication, in the second message, in this example the PS to CS Request, if vSRVCC is required for the UE, and if the MME has stored a mCAT indication.

Figure 8:
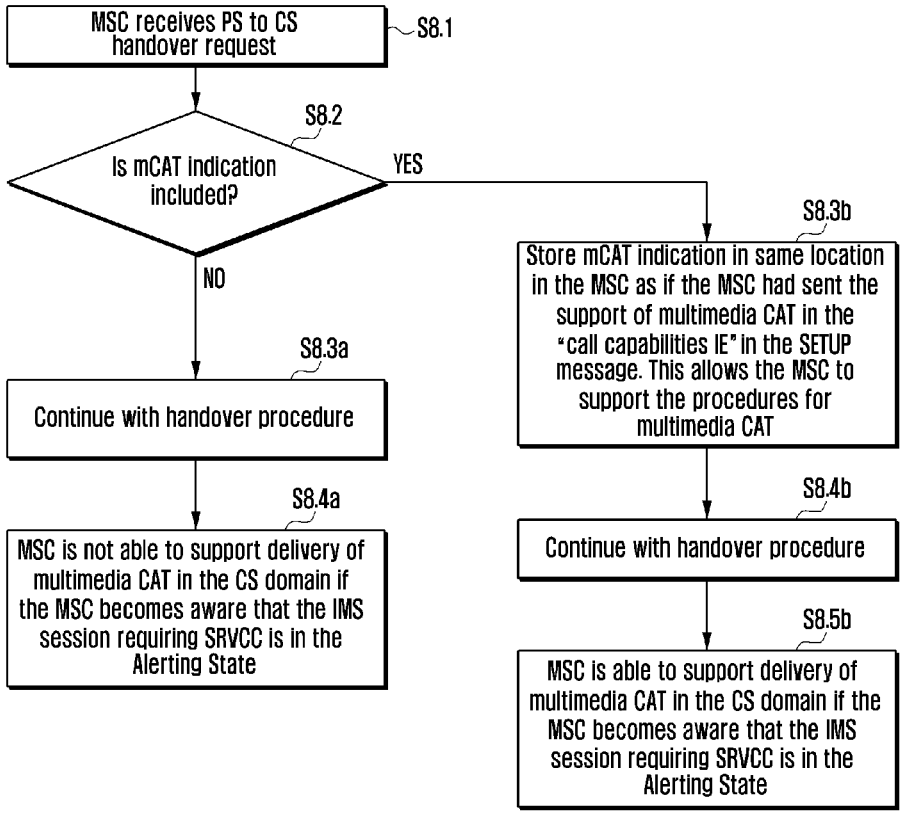
FIG. 8 is a flow diagram illustrating procedures at mobility controller (MSC) at handover in the first embodiment of the invention.

FIG. 8 illustrates procedures at the MSC at a SRVCC handover in an embodiment of the invention, according to steps S8.1 to S8.5a and S8.5b. As may be seen from FIG. 8, the MSC receives the second message, in this case a handover request, the PS to CS Request. If the second message includes the indication of a customised alerting notification capability of the user equipment in the second radio access network, in this case the mCAT indication, then in this embodiment the MSC stores the mCAT indication in same location in the MSC as if the MSC had sent the support of multimedia CAT in the "call capabilities IE" in the SETUP message. This allows the MSC to support the procedures for multimedia CAT. The MSC then continues with the handover procedure, and is able to support delivery of multimedia CAT in the CS domain if the MSC becomes aware that the IMS session requiring SRVCC is in the Alerting State. If the second message does not include the indication of a customised alerting notification capability of the user equipment in the second radio access network, in this case the mCAT indication, then in this embodiment the MSC continues with the handover procedure, but is not able to support delivery of multimedia CAT in the CS domain if the MSC becomes aware that the IMS session requiring SRVCC is in the Alerting State.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for providing a customized alerting notification by a core network server of a first radio access network in a wireless communications network, the method comprising:
   receiving, from a user equipment, a first message for an attachment of the user equipment to the first radio access network, the first message comprising an indication of a customized alerting notification capability of the user equipment in a second radio access network; and
   in response to an initiation of a handover of the user equipment from the first radio access network to the second radio access network during an alerting phase of a call initiated by the user equipment using the first radio access network, sending a second message comprising the indication of the customized alerting notification capability of the user equipment in the second radio access network to a mobility controller that is coupled with the second radio access network,
   wherein the customized alerting notification capability is an ability to replace a ring back tone of the user equipment with at least one type of media in the second radio access network during the alerting phase of the call initiated by the user equipment using the first radio access network.

2. The method according to claim 1, wherein the mobility controller supports a delivery of the customized alerting notification to the user equipment after receipt of the second message.

3. The method according to claim 1, wherein the first radio access network supports packet switched voice communication and wherein the second radio access network is capable of supporting circuit switched voice communication.

4. The method according to claim 1, wherein the user equipment includes a single radio interface for communicating with the first radio access network and the second radio access network such that only one radio connection with a radio access network can exist at any given point in time.

5. The method according to claim 4, wherein the handover comprises video Single Radio Voice Call Continuity (vSRVCC) procedures.

6. The method according to claim 5, wherein the indication is included in the first message when the user equipment supports the video Single Radio Voice Call Continuity (vSRVCC) procedures.

7. The method according to claim 1, wherein the customized alerting notification comprises video content.

8. The method according to claim 1, wherein the customized alerting notification includes a multi-media Customized Alerting Tone (mCAT).

9. The method according to claim 1, wherein the customized alerting notification capability includes a capability in a Circuit Switched (CS) domain.

10. The method according to claim 1, wherein the core network server of the first radio access network includes a Mobility Management Entity (MME).

11. The method according to claim 10, wherein the first message includes a LTE attach message.

12. The method according to claim 1, wherein the core network server of the first radio access network includes an IMS Application Server.

13. A user equipment for use in a wireless communications network, the user equipment configured to:
   communicate with a core network server of a first radio access network by use of the first radio access network;
   send a first message for an attachment to the first radio access network to the core network server, the first message comprising an indication of a customized alerting notification capability of the user equipment in a second radio access network;
   initiate a call using the first radio access network; and
   based on a handover of the user equipment from the first radio access network to the second radio access network during an alerting phase of the call and if a customized alerting notification is available, receive the customized alerting notification containing support of a mobility controller that is coupled with the second radio access network after receipt of a second message by the mobility controller from the core network server of the first radio access network, the second message comprising the indication of the customized alerting notification capability of the user equipment in the second radio access network,
   wherein the customized alerting notification capability is an ability to replace a ring back tone of the user equipment with at least one type of media in the second radio access network during the alerting phase of the call initiated by the user equipment using the first radio access network.

14. A core network server of a first radio access network, the core network server configured to:
   enable a delivery of an alerting notification at a user equipment in a wireless communications network, wherein the wireless communication network comprises a first radio access network and a second radio access network, wherein the second radio access network is coupled to a mobility controller, wherein the mobility controller is associated with the core network server of the first radio access network, and wherein the user equipment is configured to communicate with the core network server by use of the first radio access network;
   receive a first message from the user equipment based on an attachment of the user equipment to the first radio access network, the first message comprising an indication of a customized alerting notification capability of the user equipment in the second radio access network; and
   based on a handover of the user equipment from the first radio access network to the second radio access network during an alerting phase of a call initiated from the user equipment using the first radio access network, send a second message to the mobility controller comprising the indication of the customized alerting notification capability of the user equipment in the second radio access network, wherein the customized alerting notification capability is an ability to replace a ring back tone of the user equipment with at least one type of media in the second radio access network during the alerting phase of the call initiated by the user equipment using the first radio access network.

15. A mobility controller configured to:

enable a delivery of a customized alerting notification to a user equipment in a wireless communications network comprising a first radio access network and a second radio access network, wherein the second radio access network is coupled to the mobility controller, wherein the mobility controller is associated with a core network server in the first radio access network, and wherein the user equipment is configured to communicate with the core network server of the first radio access network by use of the first radio access network;

receive a message from the core network server of the first radio access network comprising an indication of the customized alerting notification capability of the user equipment in the second radio access network, wherein the message is sent to the mobility controller in response to an initiation of a handover of the user equipment from the first radio access network to the second radio access network during an alerting phase of a call initiated by the user equipment using the first radio access network; and support delivery of the customized alerting notification to the user equipment after receipt of the message, wherein the customized alerting notification capability is an ability to replace a ring back tone of the user equipment with at least one type of media in the second radio access network during the alerting phase of the call initiated by the user equipment using the first radio access network.

16. The core network server according to claim 14, wherein the mobility controller is configured to support a delivery of the customized alerting notification to the user equipment after receipt of the second message.

17. The core network server according to claim 14, wherein the first radio access network is configured to support packet switched voice communication, and wherein the second radio access network is configured to support circuit switched voice communication.

18. The core network server according to claim 14, wherein the user equipment includes a single radio interface configured to communicate with the first radio access network and the second radio access network such that only one radio connection with a radio access network can exist at any given point in time.

19. The core network server according to claim 18, wherein the handover comprises video Single Radio Voice Call Continuity (vSRVCC) procedures.

20. The core network server according to claim 19, wherein the indication is included in the first message when the user equipment is configured to support the video Single Radio Voice Call Continuity (vSRVCC) procedures.

* * * * *